F. D. WINDELL.
ELECTRIC DRAFT CONTROLLER.
APPLICATION FILED NOV. 27, 1920.
1,414,448.
Patented May 2, 1922.
2 SHEETS—SHEET 1.
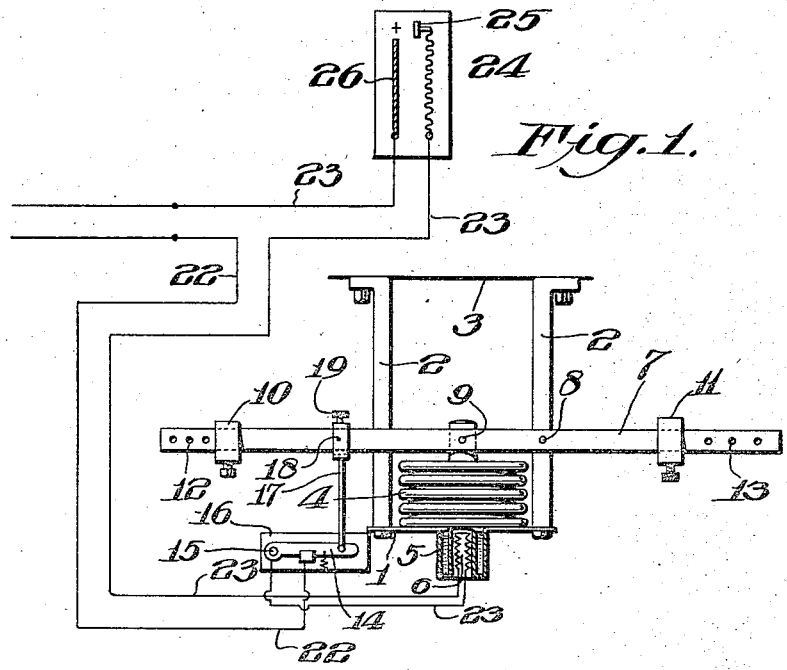
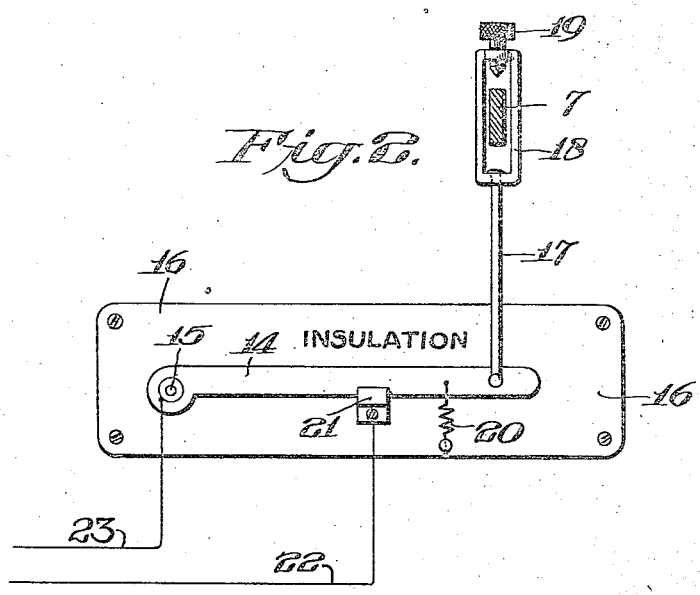
INVENTOR:
Frank D. Windell
BY Niedersheim + Fairbanks
ATTORNEYS.

F. D. WINDELL.
ELECTRIC DRAFT CONTROLLER.
APPLICATION FILED NOV. 27, 1920.

1,414,448.

Patented May 2, 1922.

UNITED STATES PATENT OFFICE.

FRANK D. WINDELL, OF PHILADELPHIA, PENNSYLVANIA.

ELECTRIC DRAFT CONTROLLER.

1,414,448. Specification of Letters Patent. Patented May 2, 1922.

Application filed November 27, 1920. Serial No. 426,883.

*To all whom it may concern:*

Be it known that I, FRANK D. WINDELL, a citizen of the United States, residing in the city and county of Philadelphia, State of Pennsylvania, have invented a new and useful Electric Draft Controller, of which the following is a specification.

My present invention comprehends a novel electric draft controller which is designed to operate with electricity of any voltage either alternating or direct current and without the intervention of electromagnets, solenoids, electric and mechanical relays, clock work mechanism, motors or other auxiliary devices.

It further comprehends a novel construction and arrangement of a controller having an expansion chamber filled to a desired degree with an expansible liquid which is expanded by the heat generated by an electric heater and a novel construction and arrangement of an automatic switch to control the heater whereby the creation of excess pressure is prevented and the amount of current used is reduced to a minimum.

It further comprehends novel connecting mechanism whereby my device may be readily connected by unskilled labor with the draft doors or other devices which it is desired to control.

Other novel features of construction and advantage will hereinafter more fully appear in the detailed description.

For the purpose of illustrating my invention, I have shown in the accompanying drawings a typical embodiment thereof which is at present preferred by me, since this embodiment will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents, in side elevation, an electric draft controller, embodying my invention.

Figure 2 represents, diagrammatically and partly in side elevation, a controlling switch employed.

Similar numerals of reference indicate corresponding parts.

Figure 3:
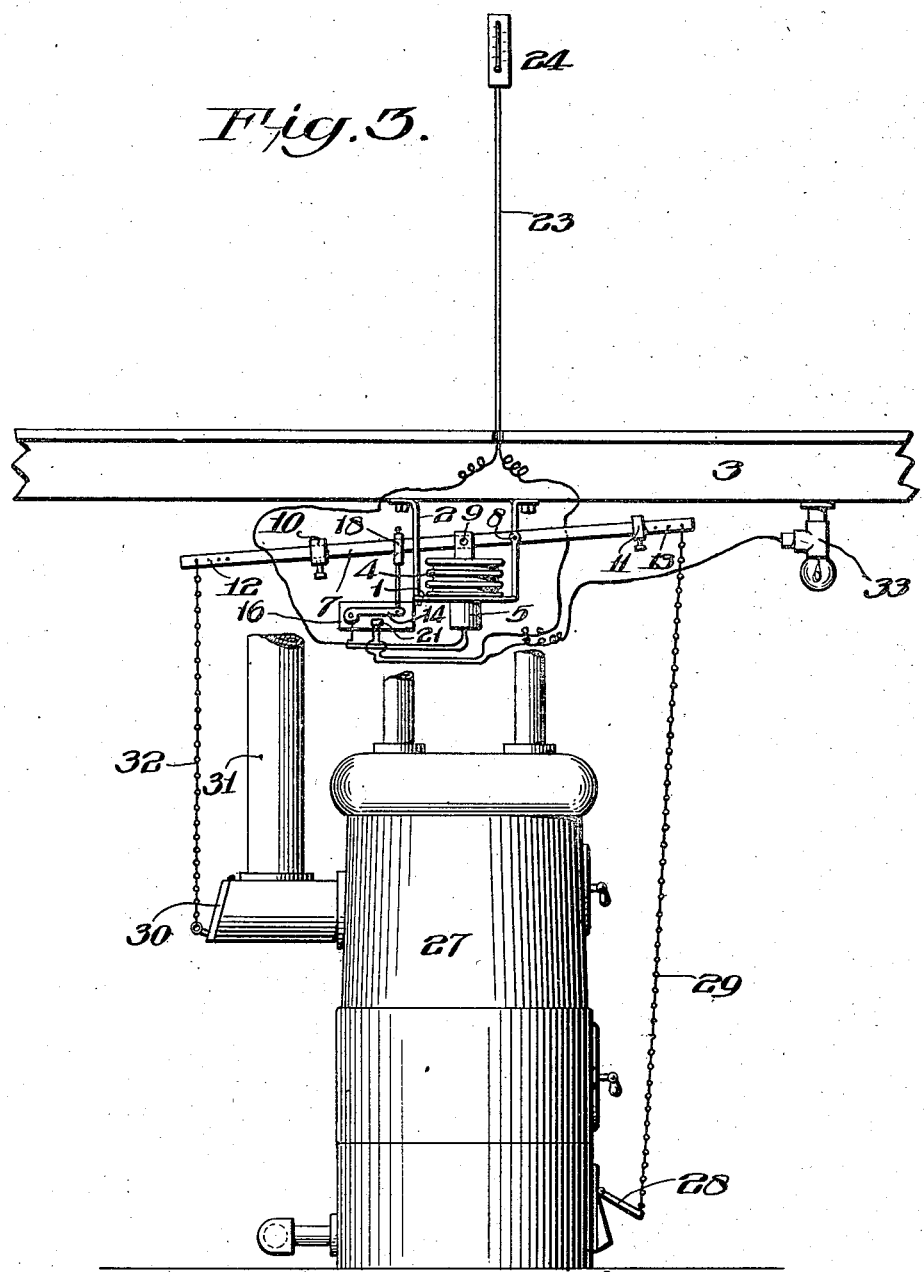
Figure 3 represents, in side elevation, a typical furnace in conjunction with my electric draft controller.

Referring to the drawings.

1 designates a base to which are connected in any desired manner the supports 2 whereby the draft controller can be suspended in any desired or conventional manner to a support 3. 4 designates an expansion member which is illustrated as a flexible metal bellows having an expansion chamber in it and which is adapted to contain an expansible medium which fills it to a desired extent. Any desired form of an expansion member may be employed. The base 1 is provided with a double wall receptacle 5 which is sealed. An electric resistance heater 6 is inserted in the receptacle 5. 7 designates a lever fulcrumed at 8 to one of the supports 2 and pivotally connected at 9 to the upper portion of the expansion member 4. The lever 7 carries on opposite sides of its fulcrum the adjustable counterweights 10 and 11, respectively. The lever 7 is provided at one end with a desired number of apertures 12 and at its opposite end with a desired number of apertures 13.

14 designates a switch lever pivotally mounted at one end, as at 15, on an insulating plate 16 which is supported in any desired manner.

The lever 14 has connected to it one end of a link 17, the other end of which is connected to a carrier 18 which is apertured to permit the lever 7 to pass through it, it being understood from Figure 2 that the aperture is of greater dimensions than the lever 7. 19 designates an adjusting screw mounted in the carrier 18 and adjustable to regulate the point at which the switch is thrown out of contact.

20 designates a spring one end of which is connected to the lever 14 and the other end of which is connected to a fixed point such as, for example, the plate 16 whereby the tendency of the spring is to move the lever 14 into engagement with the fixed contact 21 to which is connected the conductor 22.

23 designates a conductor in circuit with the electric resistance heater 6 and the switch lever 14. 24 designates a thermostat of any desired type having a contact point 25 and an expansion member 26 to co-operate with such contact point. 27 designates a heater, see Figure 3, which may be a furnace or other source of heat to generate hot water or steam or a heater of the hot air type. The heater or furnace 27 is provided with a door 28 controlling the supply of air for combustion and, as illustrated, this door is hinged in any desired manner and connected with a cable 29 which is secured in one of the apertures 13.

30 designates a check draft door in the exit conduit 31 for the products of combustion. The check draft door is connected by means of a cable 32 with one of the apertures 12 of the lever 7.

The operation of my novel electric draft controller will now be apparent to those skilled in this art and is as follows:—

The thermostat 24 is located in the room or place from which the temperature is to be controlled and is connected to the electric service system 33 of the building and to the draft controller as illustrated.

When the room in which the thermostat is located reaches the proper temperature, the expansion member 26 of the thermostat expands and closes the circuit through the conductors 23 and 22, the electric heater and the switch so that the electric heater 6 generates heat by the current passing through it and imparts heat to the liquid within the expansion member 4 causing such liquid to expand. This causes the expansion member 4 to expand upwardly and rock the lever 7 in a direction to cause the draft door 28 to close and the check draft door 30 to open.

When the temperature of the room drops below that at which the thermostat is set, the thermostat opens the circuit so that the current does not flow to the electric heater and the lever 7 will return towards its neutral position, it being apparent that the link 17 will not move the switch lever 14 into engagement with the contact 21 until the expansion chamber has been contracted.

In the operation it will be seen that the switch lever 14 does not break contact until a predetermined upward movement of the lever 7 has taken place. The carrier 18 is so adjusted with respect to the lever 7 that a predetermined upward movement of the lever 7 is permitted sufficiently to actuate the doors 28 and 30 without opening the switch lever 14. On a further upward movement of the lever 7, however, it will be apparent that the link connection 17 will be drawn upwardly and the switch lever will be moved out of engagement with the contact 21, the tension of the spring 20 being of course increased.

It will be seen that even if the contacts of the thermostat are closed the circuit leading to the heater 6 will be broken. The purpose of this is to prevent excessive pressure being created in the expansion member 4. This causes the current consumption to be reduced to a minimum. As the pressure in the expansion member 4 decreases, it will be apparent that the lever 7 will move downwardly thereby permitting the downward movement of the switch lever 14 due to its own weight and the action of the spring 20 so that the switch lever 14 will come into engagement with the contact 21. It will thus be seen that if at this time the contacts of the thermostat are closed, the circuit will be closed through the switch and heater 6 and the proper amount of heat will be maintained in the expansion member 4 to maintain the necessary pressure to retain the doors 28 and 30 in their proper positions.

The liquid in the expansion chamber will retain heat for a considerable time after being heated so that the position of the draft doors 28 and 30 will not be materially affected for the desired period of time.

It will now be apparent that I have devised a new and useful electric draft controller which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. The combination with a heater having an air inlet damper and a check damper, of an electrically operated draft controller comprising the following instrumentalities:—an expansible fluid containing member, a lever actuated thereby and having one end connected to the air inlet damper and the other end connected to the check damper, a thermostatically controlled electric heater acting on the fluid in said member, and switch mechanism in circuit with said electric heater and controlled by said lever.

2. The combination with a heater having an air inlet damper and a check damper, of an electrically operated draft controller comprising the following instrumentalities:—an expansible and contractible liquid containing member, a lever connected with said member and actuated thereby, an electric heater controlling the temperature of the liquid, switch mechanism having a fixed contact and a movable lever in circuit with said heater, a thermostat in circuit with said heater and said switch mechanism, said switch mechanism including an apertured block through which said first lever extends and in which it has limited movement, and connections from said first lever to said air inlet damper and to said check damper.

3. An electric draft controller, comprising an expansible and contractible liquid containing member, an electric heater to vary the temperature of the liquid, a switch mechanism in circuit with said heater and having a fixed contact and a co-operating movable contact, a spring tending to retain said contacts in engagement, an apertured block connected with said movable contact, a lever having limited movement in said block and connected with said member to move with it, a thermostat in circuit with said electric heater and said switch mechanism, and means to counterbalance said lever.

4. An electric draft controller, comprising an expansible and contractible liquid containing member, an electric heater to vary the temperature of the liquid, a switch mechanism in circuit with said heater and having a fixed contact and a co-operating movable contact, a spring tending to retain said contacts in engagement, an apertured block connected with said movable contact, a lever having limited movement in said block and connected with said member to move it, means to vary the relative movement between said block and lever, and a thermostat in circuit with said electric heater and said switch mechanism.

5. An electric temperature control system, consisting of a source of heat, dampers controlling it, a thermostat, an electrically controlled expansion chamber, and an automatic contact switch connected in series with said thermostat, arranged to control the temperature of the room in which the thermostat is located by the action of the temperature changes on the thermostat and arranged to actuate dampers controlling the source of heat by the combined action of the thermostat and automatic switch.

6. An electrical control comprising in combination a plurality of dampers, an expansion member, a resistance heater for said expansion member, an electric circuit controlling said resistance heater and including a thermostat and an automatic switch, and an operative connection between said dampers and expansion member for causing a predetermined movement of said dampers prior to the opening of said switch and for permitting said switch to close regardless of whether the thermostat is closed or open.

7. The combination with a heater, of an electrically operated controller therefor, comprising an expansible fluid containing member, a lever actuated thereby and controlling the combustion in said heater, a thermostatically controlled electric heater acting on the fluid in said member, and switch mechanism in circuit with said electric heater and controlled by said lever.

FRANK D. WINDELL.

Witness:
H. S. FAIRBANKS.